(12) United States Patent
Gupta et al.

(10) Patent No.: US 12,337,859 B2
(45) Date of Patent: Jun. 24, 2025

(54) PERSONALIZED SPEED LIMITER

(71) Applicant: Toyota Motor Engineering & Manufacturing North America, Inc., Plano, TX (US)

(72) Inventors: Rohit Gupta, Santa Clara, CA (US); Ziran Wang, San Jose, CA (US); Runjia Du, West Lafayette, IN (US); Kyungtae Han, Palo Alto, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 231 days.

(21) Appl. No.: 18/085,868

(22) Filed: Dec. 21, 2022

(65) Prior Publication Data

US 2024/0208520 A1 Jun. 27, 2024

(51) Int. Cl.
*B60W 50/08* (2020.01)
*B60W 10/18* (2012.01)
*G06V 20/58* (2022.01)

(52) U.S. Cl.
CPC .......... *B60W 50/085* (2013.01); *B60W 10/18* (2013.01); *G06V 20/582* (2022.01); *B60W 2555/60* (2020.02)

(58) Field of Classification Search
CPC ............... B60W 50/085; B60W 10/18; B60W 2555/60; B60W 50/14; G06V 20/582; G08G 1/09623
See application file for complete search history.

(56) References Cited

U.S. PATENT DOCUMENTS

| | | | |
|---|---|---|---|
| 7,042,347 B2 | 5/2006 | Cherouny | |
| 7,379,801 B2 | 5/2008 | Heffington | |
| 7,616,781 B2 * | 11/2009 | Schofield | B60R 1/24 382/172 |
| 7,761,921 B2 | 7/2010 | Gannon et al. | |
| 8,751,133 B2 | 6/2014 | Poulin | |
| 9,275,208 B2 | 3/2016 | Protopapas | |
| 9,704,132 B2 | 7/2017 | Fraccaroli | |
| 10,029,685 B1 | 7/2018 | Hubbard et al. | |
| 10,194,017 B2 | 1/2019 | Skelton | |
| 10,196,059 B2 | 2/2019 | Kelly et al. | |
| 10,479,200 B2 | 11/2019 | Morisset et al. | |
| 2012/0215416 A1 * | 8/2012 | Poulin | B60W 30/146 701/93 |
| 2013/0044141 A1 | 2/2013 | Markiewicz et al. | |

(Continued)

OTHER PUBLICATIONS

Brookhuis et al., "Limiting speed, towards an intelligent speed adapter (ISA)", Transportation Research Part F 2 (1999), pp. 81-90 (10 pages).

(Continued)

*Primary Examiner* — Joseph J Dallo
(74) *Attorney, Agent, or Firm* — Christopher G. Darrow; Darrow Mustafa PC

(57) ABSTRACT

A speed limiter for a vehicle can be personalized. The speed limiter can be caused to be activated. A user can provide a user input on a user interface. The user input can include a speed limiter personalization setting. In response to the user input, the speed limiter personalization setting can be caused to be implemented.

18 Claims, 10 Drawing Sheets

(56) References Cited

U.S. PATENT DOCUMENTS

| | | | |
|---|---|---|---|
| 2013/0085655 A1* | 4/2013 | Kii | F02D 41/0205 |
| | | | 701/103 |
| 2015/0278615 A1* | 10/2015 | Ogawa | H04N 7/183 |
| | | | 348/148 |
| 2016/0347312 A1* | 12/2016 | Tomatsu | B60W 50/14 |
| 2018/0040243 A1 | 2/2018 | Peng et al. | |
| 2018/0079412 A1* | 3/2018 | Tomatsu | B60W 30/146 |
| 2018/0354515 A1* | 12/2018 | Allexi | B60W 30/146 |
| 2019/0027030 A1* | 1/2019 | Hou | G06F 18/24 |
| 2019/0363988 A1* | 11/2019 | Dey | G06N 20/00 |

OTHER PUBLICATIONS

Ganesh, "Pic Microcontroller Based Automatic Speed Limiter for Automobiles", Research Trends in Multidisciplinary Research, vol. 31, Chapter 11, pp. 183-208, Feb. 2022 (26 pages).

* cited by examiner

1100

```
┌─────────────────────────────────────────────────────────────┐
│           Causing the speed limiter to be activated          │
│                             1110                             │
└─────────────────────────────────────────────────────────────┘
                               │
┌─────────────────────────────────────────────────────────────┐
│   Receiving a user input on an input interface, the user input │
│      including a speed limiter personalization setting       │
│                             1120                             │
└─────────────────────────────────────────────────────────────┘
                               │
┌─────────────────────────────────────────────────────────────┐
│  Causing the speed limiter personalization setting to be implemented │
│                             1130                             │
└─────────────────────────────────────────────────────────────┘
```

FIG. 11

PERSONALIZED SPEED LIMITER

FIELD

The subject matter described herein relates in general to vehicles and, more particularly, to speed limiters for vehicles.

BACKGROUND

A speed limiter is a device that is used to limit the top speed of a vehicle. Some original equipment manufacturers in Europe offer speed limiters. For some types of vehicles and/or in some jurisdictions, speed limiters are mandated by law.

SUMMARY

In one respect, the present disclosure is directed to a method of personalizing a speed limiter for a vehicle. The method can include causing the speed limiter to be activated. The method can include receiving a user input on a user interface. The user input can include a speed limiter personalization setting. The method can include causing the speed limiter personalization setting to be implemented.

In another respect, the present disclosure is directed to a system for personalizing a speed limiter for a vehicle. The system can include a user interface. The system can include one or more processors operatively connected to the user interface. The one or more processors can be programmed to initiate executable operations. The executable operations can include causing the speed limiter to be activated. The executable operations can include receiving a user input on the user interface. The user input can include a speed limiter personalization setting. The executable operations can include causing the speed limiter personalization setting to be implemented.

BRIEF DESCRIPTION OF THE DRAWINGS

FIG. 11 is an example of a method for personalizing a speed limiter for a vehicle.

DETAILED DESCRIPTION

Figure 1:
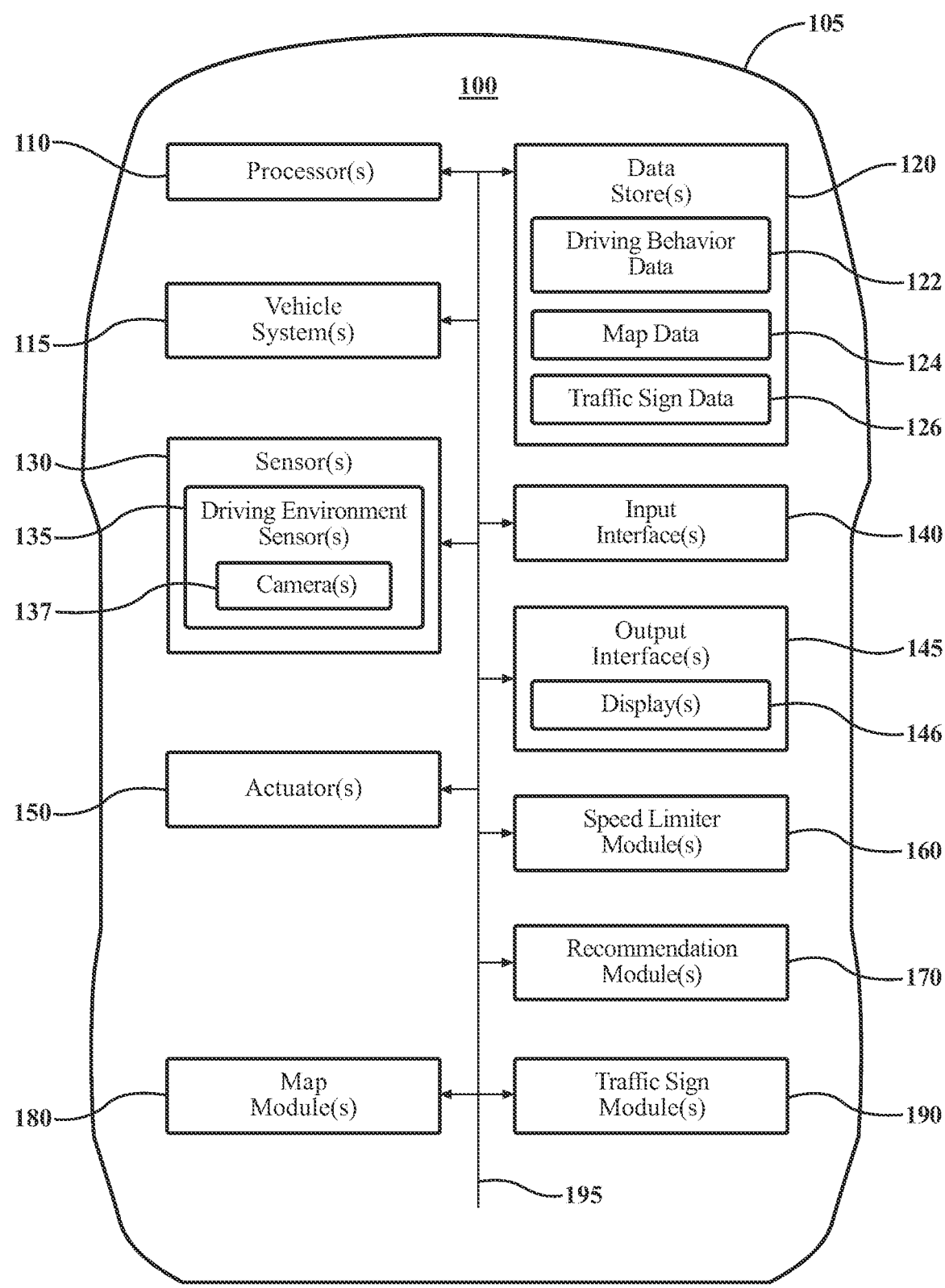
FIG. 1 is an example of a vehicle with a speed limiter.

Speed limiters are typically provided in the form of a hardware switch in a vehicle. Speed limiters defined by a physical switch take up space within a vehicle, such as on a steering wheel. Further, such speed limiters only allow a user to turn the speed limiter on and off.

Accordingly, arrangement described herein are directed to a personalized speed limiter for a vehicle. The speed limiter can be software-defined. A user can provide a user input on a user interface. The user input can include a speed limiter personalization setting. In response, the speed limiter personalization setting can be caused to be implemented. A "speed limiter personalization setting" can relate to any aspect of the implementation of the speed limiter. As a result, the operation of the speed limiter can be tailored to the preferences of a vehicle driver or other vehicle occupant.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-11, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

FIG. 1 is an example of a system 100 for personalizing a speed limiter for a vehicle. Some of the possible elements of the system 100 are shown in FIG. 1 and will now be described. It will be understood that it is not necessary for the system 100 to have all of the elements shown in FIG. 1 or described herein. The system 100 can include one or more processors 110, one or more vehicle systems 115, one or more data stores 120, one or more sensors 130, one or more input interfaces 140, one or more output interfaces 145, one or more actuators 150, one or more speed limiter modules 160, one or more recommendation modules 170, one or more map modules 180, and/or one or more traffic sign modules 190.

In one or more arrangements, at least some of these various elements of the system 100 can be located onboard a vehicle 105. In one or more arrangements, all of the various elements of the system 100 can be located onboard the vehicle 105. As used herein, "vehicle" means any form of motorized or powered transport, now known or later developed. Non-limiting examples of vehicles include automobiles, motorcycles, acrobats, or any other form of motorized transport. While arrangements herein will be described in connection with land-based vehicles, it will be appreciated that arrangements are not limited to land-based vehicles. Indeed, in some arrangements, the vehicle can be water-based or air-based vehicles. The vehicle 105 may be operated manually by a human driver, semi-autonomously by a mix of manual inputs from a human driver and autonomous inputs by one or more vehicle computers, fully autonomously by one or more vehicle computers, or any combination thereof. Of course, it will be appreciated that one or more elements of the system 100 can be located remote from the vehicle 105.

The various elements of the system 100 can be communicatively linked through one or more communication networks 195. As used herein, the term "communicatively linked" can include direct or indirect connections through a communication channel or pathway or another component or system. A "communication network" means one or more components designed to transmit and/or receive information from one source to another. The communication network(s) 195 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network(s) 195 further can be implemented as or include one or more wireless networks, whether short or long range. For example, in terms of short-range wireless networks, the communication network(s) 195 can include a local wireless network built using a Bluetooth or one of the IEEE 802 wireless communication protocols. e.g., 802.11a/b/g/i, 802.15, 802.16, 802.20, Wi-Fi Protected Access (WPA), or WPA2. In terms of long-range wireless networks, the communication network(s) 195 can include a mobile, cellular, and or satellite-based wireless network and support voice, video, text, and/or any combination thereof. Examples of long-range wireless networks can include GSM, TDMA, CDMA, WCDMA networks or the like. The communication network(s) 195 can include wired communication links and/or wireless communication links. The communication network(s) 195 can include any combination of the above networks and/or other types of networks. The communication network(s) 195 can include one or more routers, switches, access points, wireless access points, and/or the like. In one or more arrangements, the communication network(s) 195 can include Vehicle-to-Vehicle (V2V), Vehicle-to-Infrastructure (V2I), Vehicle-to-Cloud (V2C), or Vehicle-to-Everything (V2X) technology, which can allow for communications between the vehicle 105 and other vehicles.

One or more elements of the system 100 include and/or can execute suitable communication software, which enables two or more of the elements to communicate with each other through the communication network(s) 195 and perform the functions disclosed herein.

Each of the above noted elements of the system 100 will be described in turn below. The system 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other.

The system 100 can include one or more vehicle systems 115. The vehicle system(s) 115 can include a propulsion system, a braking system, a steering system, a throttle system, a transmission system, a signaling system, and/or a navigation system. Each of these systems can include one or more mechanisms, devices, elements, components, systems, and/or combination thereof, now known or later developed. However, the system 100 can include more, fewer, or different systems. It should be appreciated that although particular vehicle systems are separately listed, each or any of the systems or portions thereof may be otherwise combined or segregated via hardware and/or software within the vehicle 105.

The braking system can include one or more mechanisms, devices, elements, components, systems, and/or combinations thereof, now known or later developed, configured to decelerate the vehicle 105. As an example, the braking system can use friction to slow the wheels/tires of the vehicle 105.

The navigation system can include one or more mechanisms, devices, elements, components, systems, applications and/or combinations thereof, now known or later developed, configured to determine the geographic location of the vehicle 105 and/or to determine a travel route for the vehicle 105. The navigation system can include one or more mapping applications to determine a travel route for the vehicle 105. The navigation system can include a global positioning system, a local positioning system, or a geolocation system.

In one or more arrangements, the navigation system can include a global positioning system, a local positioning system or a geolocation system. The navigation system can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system can use Transmission Control Protocol (TCP) and/or a Geographic information system (GIS) and location services.

The navigation system may include a transceiver configured to estimate a position of the vehicle 105 with respect to the Earth. For example, navigation system can include a GPS transceiver to determine the vehicle's latitude, longitude and/or altitude. The navigation system can use other systems (e.g., laser-based localization systems, inertial-aided GPS, and/or camera-based localization) to determine the location of the vehicle 105.

The system 100 can include one or more data stores 120 for storing one or more types of data. The data store(s) 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 120 can be a component of the processor(s) 110, or the data store(s) 120 can be operatively connected to the processor(s) 110 for use thereby. In some arrangements, the data store(s) 120 can be located remote from the vehicle 105. The term "operatively connected," as used throughout this description, can include direct or indirect connections, including connections without direct physical contact.

The data store(s) 120 can include driving behavior data 122. The driving behavior data 122 can include any information about the driving behavior of a driver of a vehicle, particularly with respect to the driving behavior relative to a speed limit. The driving behavior data 122 can include the amount of time before or after a speed limit sign that a user adjusts the speed of the vehicle when there is a change in the speed limit. The driving behavior data 122 can include the distance before or after a speed limit sign that a user adjusts the speed of the vehicle when there is a change in the speed limit. In some arrangements, the driving behavior data 122 can be based on driving behaviors of a driver of the vehicle 105. Alternatively or additionally, the driving behavior data 122 can be based on driving behaviors from a general population of drivers or any suitable group of drivers.

The data store(s) 120 can include map data 124. The map data 124 can include maps of one or more geographic areas. In some instances, the map data 124 can include information or data on roads, traffic control devices, road markings, streetlights, structures, features, and/or landmarks in the one or more geographic areas. The map data 124 can include measurements, dimensions, distances, positions, coordinates, and/or information for one or more items included in the map data 124 and/or relative to other items included in the map data 124. For instance, the map data 124 can include the dimensions of individual travel lanes of a road. As an example, the map data can include the width of a travel lane and/or the centerline of the travel lane. The map data 124 can include a digital map with information about road geometry. In one or more arrangement, the map data 124 can include information about the ground, terrain, roads, surfaces, and/or other features of one or more geographic areas. The map data 124 can include elevation data in the one or more geographic areas. The map data 124 can define one or more ground surfaces, which can include paved roads, unpaved roads, land, and other things that define a ground surface. The map data 124 can include lane markings and associated dimensions. The map data 124 can be high quality and/or highly detailed. The map data 124 can include speed limit information associated with one or more roads. Such speed limit information can be highly detailed and can reflect the governing speed limit for one or more roads or one or more portions of one or more roads. The speed limit information can include changes in speed limit along a road.

The data store(s) 120 can include traffic sign data 126. The traffic sign data 126 can include images or other data of various road signs, especially road signs that include a speed limit or are indicative of a reduced speed limit. The traffic sign data 126 can for any type of speed limit sign, now known or later developed. The traffic sign data 126 can include indicia of a traffic sign, including size, shape, color, and/or markings. The traffic sign data 126 can include location data of traffic signs.

The system 100 can include one or more sensors 130. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the system 100 includes a plurality of sensors, the sensors can work independently from each other. Alternatively, two or more of the sensors can work in combination with each other. In such case, the two or more sensors can form a sensor network.

The sensor(s) 130 can include any suitable type of sensor. Various examples of different types of sensors will be described herein. However, it will be understood that the embodiments are not limited to the particular sensors described.

The sensor(s) 130 can include one or more driving environment sensors 135. Such sensors can be used to detect, determine, assess, monitor, measure, quantify, acquire, and/or sense, directly or indirectly, something about the external environment of the vehicle 105. For instance, the driving environment sensor(s) 135 can be used to detect, determine, assess, monitor, measure, quantify, acquire, and/or sense, directly or indirectly, the presence of one or more objects in the external environment of the vehicle 105, the position or location of each detected object relative to the vehicle 105, the distance between each detected object and the vehicle 105 in one or more directions (e.g. in a longitudinal direction, a lateral direction, and/or other direction(s)), the elevation of a detected object, the speed of a detected object, the acceleration of a detected object, the heading angle of a detected object, and/or the movement of each detected obstacle.

The driving environment sensor(s) 135 can be any suitable sensor, now known or later developed. In one or more arrangements, the driving environment sensor(s) 135 can include one or more radar sensors, one or more lidar sensors, one or more sonar sensors, and/or one or more cameras 137.

The camera(s) 137 can be any type of camera, now known or later developed. The camera(s) 137 can be configured to capture visual data. "Visual data" includes video and/or image information/data. The camera(s) 137 can be high resolution cameras. The camera(s) 137 can capture visual data in any suitable wavelength of the electromagnetic spectrum.

The system 100 can include one or more input interfaces 140. An "input interface" includes any device, component, system, element or arrangement or groups thereof that enable information/data to be entered into a machine. The input interface(s) 140 can receive an input from a vehicle occupant (e.g., a driver or a passenger). Any suitable input interface(s) 140 can be used, including, for example, a keypad, display, touch screen, multi-touch screen, button, joystick, mouse, trackball, microphone and/or combinations thereof.

The system 100 can include one or more output interfaces 145. An "output interface" includes any device, component, system, element or arrangement or groups thereof that enable information/data to be presented to a vehicle occupant (e.g., a driver, a passenger, etc.). The output interface(s) 145 can present information/data to the vehicle occupant. The output interface(s) 145 can include a display. Alternatively or in addition, the output interface(s) 145 may include an earphone and/or speaker. In some arrangements, the output interface(s) 145 can include a projector. Some components of the system 100 may serve as both a component of the input interface(s) 140 and a component of the output interface(s) 145.

Figure 2:
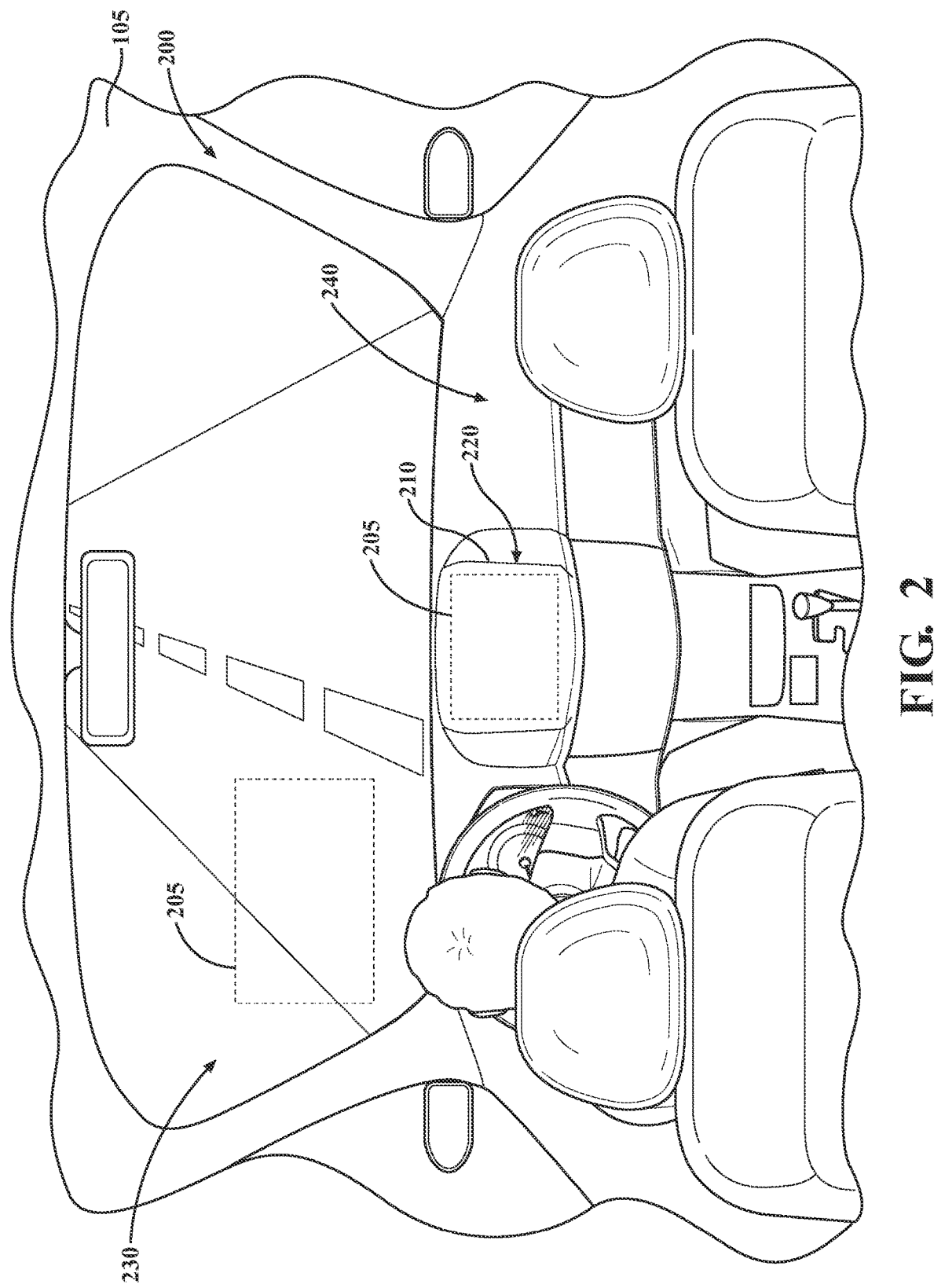
FIG. 2 is an example of an interview of a vehicle, showing different locations for displaying a user interface element for the speed limiter.

The output interface(s) 145 can include one or more displays 146. FIG. 2 is an example of a cabin 200 of the vehicle 105, showing different locations for displaying a speed limiter user interface element 205, as will be described herein. For instance, the speed limiter user interface element 205 can be presented on a display 210 that is part of an infotainment system 220. As another example, the speed limiter user interface element 205 can be presented on a surface of the windshield 230 or a surface of the dashboard 240 of the vehicle 105.

In some arrangements, the speed limiter user interface element 205 can be presented as a graphical user interface element on a display. In some arrangements, the speed limiter user interface element 205 can be presented as a projection, such as by one or more projectors located within the cabin 200. In some arrangements, the speed limiter user interface element 205 can be presented on a heads-up display. The speed limiter user interface element 205 can be presented on any other object within or surface of the vehicle. Of course, the speed limiter user interface element 205 can be presented on a plurality of surfaces or objects, including any combination of the objects/surfaces noted above. Thus, it will be appreciated that arrangements described herein are not limited to any particular user interface for presenting the speed limiter user interface element 205.

The system can include one or more actuators 150. The actuator(s) 150 can be any element or combination of elements operable to modify, adjust and/or alter one or more of the vehicle systems 115 or components thereof to responsive to receiving signals or other inputs from the processor 110 and/or one or more of the modules described herein. The actuator(s) 150 can be any suitable type of actuator, now known or later developed. For instance, the one or more actuators 150 can include motors, pneumatic actuators, hydraulic pistons, relays, solenoids, and/or piezoelectric actuators, just to name a few possibilities. The actuator(s) 150 can be used to control the speed of the vehicle 105, such as by controlling the supply of fuel/energy to an engine of the vehicle 105 and/or by control the brakes of the vehicle 105.

The system 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data store 120 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The system 100 can include one or more speed limiter modules 160. The speed limiter module(s) 160 can be configured to limit the top speed of the vehicle 105 so that the vehicle 105 does not exceed the top speed.

The speed limiter module(s) 160 can be operatively connected to communicate with the various vehicle systems 115 and/or individual components thereof. For example, the speed limiter module(s) 160 can be in communication to send and/or receive information from the various vehicle systems 115 to control the speed of vehicle 105. The speed limiter module(s) 160 can limit the top speed of the vehicle 105 in any suitable manner, now known or later developed. For instance, the speed limiter module(s) 160 can cause the vehicle 105 to reduce or limit the speed of the vehicle by decreasing the supply of fuel/energy to the engine or motor, by applying the brakes, controlling power supplied to wheels, and/or by changing a frequency of AC power from an inverter to a motor so that the speed of the vehicle 105 is at or below the top speed setting. The speed limiter module(s) 160 can control the speed of the vehicle autonomously. As used herein, "cause" or "causing" means to make, force, compel, direct, command, instruct, and/or enable an event or action to occur or at least be in a state where such event or action may occur, either in a direct or indirect manner.

Figure 3:
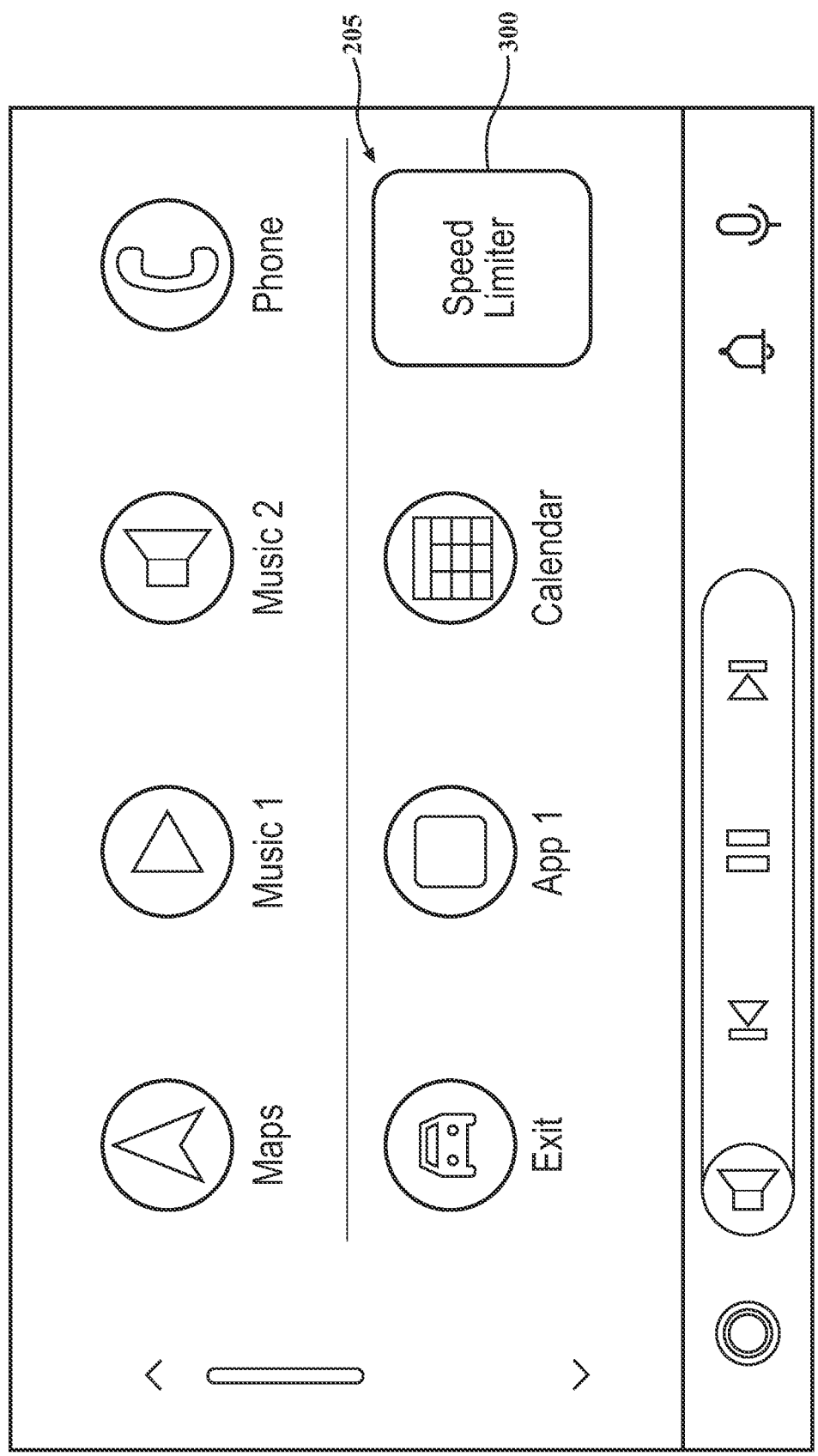
FIG. 3 is an example of a user interface element for the speed limiter.

In some arrangements, the speed limiter module(s) 160 can be configured to cause a speed limiter user interface element 205 to be presented on one or more output interfaces 145 of the vehicle 105. The speed limiter user interface element 205 can have any suitable form. One example of the speed limiter user interface element 205 is shown in FIG. 3. In this example, the speed limiter user interface element 205 can be a graphical user interface element (e.g., a button 300). The button 300 can have any suitable form. The button 300 can be presented on a display within the vehicle 105, including any of those shown in FIG. 2 and/or in other locations.

Figure 4:
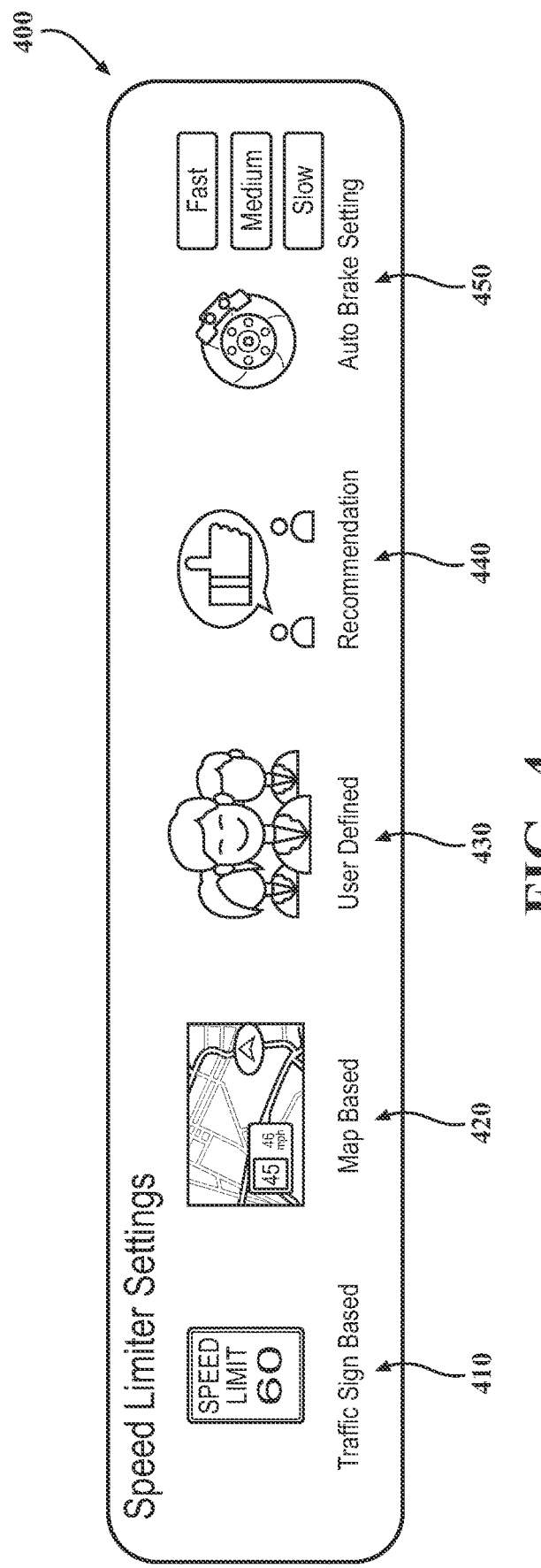
FIG. 4 is an example of a user interface element for personalization options for the speed limiter.

When a user presses or otherwise selects (e.g., by voice input) the button 300, the speed limiter module(s) 160 can be configured to cause a speed limiter settings menu 400 can be presented to the user. An example of the speed limiter settings menu 400 is shown in FIG. 4. Of course, it will be understood that this example is not intended to be limiting. The speed limiter settings menu 400 can present various options for a user to personalize the speed limiter. Non-limiting examples of these options include a traffic sign-based option 410, a map-based option 420, a user defined option 430, a recommendation option 440, and an auto brake setting option 450. It will be appreciated that there can be additional, fewer, and/or alternative options presented on the speed limiter settings menu 400.

The speed limiter module(s) 160 can be configured to receive user inputs provided on the input interface(s) 140, such as inputs provided on the button 300 and/or speed limiter settings menu 400. It will be appreciated that, in this example, the user inputs can be provided by touching the display. However, other suitable forms of input can be enabled, such as voice inputs.

The speed limiter module(s) 160 can be configured to analyze such inputs to determine an appropriate action to take. For instance, the user input can include a speed limiter activation request and a speed limiter personalization setting.

In some arrangements, the speed limiter module(s) 160 can be configured to automatically activate the speed limiter when the vehicle is in use (e.g., when the car is started, when the car is in drive, etc.). In such case, a user can deactivate the speed limiter if desired. In some arrangements, the speed limiter module(s) 160 can be configured to activate the speed limiter in response to a user input (e.g., touch input, voice input, etc.). In such arrangements, the speed limiter can be in an off or inactive state until activated by a user. In some arrangements, the top speed of the vehicle 105 can be set by a user, manufacturer, or some other entity. For instance, there can be a default setting. In some arrangements, the default setting can be used until modified by a user.

In some arrangements, when a user presses the button 300, the speed limiter module(s) 160 can activate the speed limiter. In some instances, the speed limiter can be activated with default settings, the previous settings, or some other setting. When the user selects one or more options from the speed limiter settings menu 400, the speed limiter can be customized in accordance with the user's preferences. The selection of one of the options of the speed limiter settings menu 400 may or may not cause a new field to be presented. The various options will be described in turn below.

Figure 5:
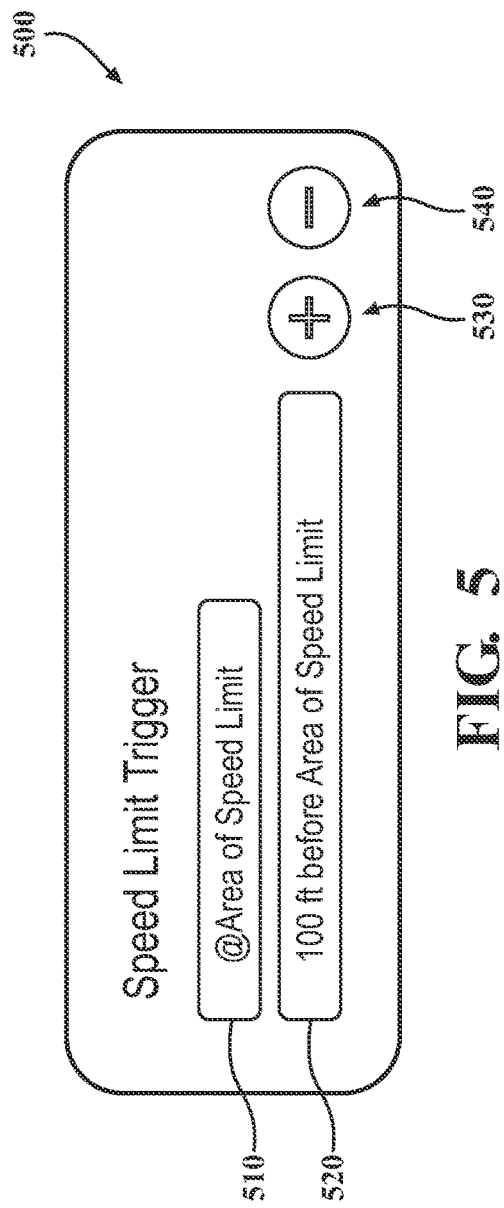
FIG. 5 is an example of a user interface element for a user-defined personalization option for the speed limiter.

If a user selects the user defined option 430, then a user defined speed limiter menu can be presented. An example of a user defined speed limiter menu 500 is shown in FIG. 5. The user defined speed limiter menu 500 can have any suitable form. In this example, a user can be presented with an option to cause the speed of the vehicle 105 to be limited at the area of the speed limit. If this option is desired, the user can press the @Area of Speed Limit button 510. In this case, the speed limiter will be activated to limit the speed of the vehicle 105, if necessary, when the vehicle 105 reaches a new speed limit zone or when the vehicle 105 is already in a speed limited zone.

Alternatively or additionally, the user defined speed limiter menu 500 can present an option to activate the speed limiter at a certain distance before the area of the speed limit. If this option is desired, the user can press the_ft before Area of Speed Limit button 520. In some arrangements, the_ft before Area of Speed Limit button 520 can present a default distance value. In this example, the default distance value can be 100 feet. However, it will be appreciated that other default distance values can be established by a user, manufacturer, or some other entity. The user can set a desired value by adjusting the default value by using up or down user interface elements 530, 540 to reach the desired distance. Alternatively or additionally, the user can directly input the distance value. In this case, the speed limiter will be activated to limit the speed of the vehicle 105, if necessary, starting when the vehicle 105 is the desired distance before a new speed limit zone. If the vehicle 105 is already in a speed limit zone, then the speed limiter can be immediately activated and ready to limit the speed of the vehicle 105 if necessary.

By setting a distance before a speed limit change area, arrangements can help a driver who may miss the change. By activating the change before the traffic sign is reached, the system 100 can help a driver to avoid speeding tickets in speed trap.

The inputs provided by the user on the user defined option 430 can be implemented by the speed limiter module(s) 160 and/or the processor(s) 110.

If the user selects the traffic sign-based option 410, then the system 100 can be configured to automatically adjust the speed of the vehicle based on speed limit signs and/or other traffic signs in the driving environment. As noted above, the system 100 can include one or more the traffic sign modules 190. The traffic sign module(s) 190 can be configured to detect the presence of traffic limit signs in the driving environment of the vehicle 105. The traffic sign module(s) 190 can be configured to analyze data acquired by the driving environment sensor(s) 135, such as the camera(s) 137 to detect, identify, and/or classify a speed limit sign. The traffic sign module(s) 190 can use any suitable technique, including, for example, template matching and other kinds of computer vision and/or image processing techniques and/or other artificial or computational intelligence algorithms or machine learning methods. The traffic sign module(s) 190 can include any suitable object recognition software. In some instances, the traffic sign module(s) 190 can detect the signs directly within the data acquired by the camera(s) 137 and/or the driving environment sensor(s) 135.

Alternatively or additionally, the traffic sign module(s) 190 can query the traffic sign data 126 for possible matches. For instance, images captured by the driving environment sensor(s) 135 (such as the camera(s) 137) can be compared to images in the traffic sign data 126 for possible matches. The traffic sign module(s) 190 can identify a detected object as a particular object if there is a match between the captured image/data of the object and an image or data in the traffic sign data 126. "Match" or "matches" means that an image or other information collected by the driving environment sensor(s) 135 and one or more of the images or other information in the traffic sign data 126 are substantially identical. For instance, an image or other information collected by the driving environment sensor(s) 135 and one or more of the images or other information in the traffic sign data 126 can match within a predetermined probability (e.g., at least about 85%, at least about 90%, at least about 95% or greater) or confidence level. In one or more arrangements, the detected object can be compared to identifying features of an object, such as color, shape, size, etc.

The traffic sign module(s) 190 can be configured to detect the speed limit from a traffic sign. The traffic sign module(s) 190 can be configured to do so in any suitable manner. For instance, the traffic sign module(s) 190 can use template matching and other kinds of computer vision and/or image processing techniques and/or other artificial or computational intelligence algorithms or machine learning methods. As another example, the traffic sign module(s) 190 can query the traffic sign data 126 for possible matches of the speed limit numbers.

When the speed limit is identified, the traffic sign module(s) 190 can limit the speed of the vehicle 105 to at or below the speed limit. The traffic sign module(s) 190 can limit the speed of the vehicle 105 when it is at the speed limit sign, before the speed limit sign, immediately upon detecting the speed limit from the sign, or at any other suitable time or distance.

If the user selects the map-based option 420, then the system 100 can be configured to automatically limit the speed of the vehicle 105 based on a speed limit in a map. As noted above, the system 100 can include one or more the map modules 180. The map module(s) 180 can be configured to use the navigation system of the vehicle 105 and/or the map data 124 to determine a current location of the vehicle 105. The current location can be a specific point, area, road, intersection, etc. The map module(s) 180 can be configured to determine, using the map data 124, whether there is speed limit data associated with the current location of the vehicle 105. If there is speed limit data for the current location of the vehicle 105, the map module(s) 180 can limit the speed of the vehicle 105 to at or below the speed limit. The map module(s) 180 can limit the speed of the vehicle 105, if needed, when it determines the speed limit for the current location of the vehicle or at any other suitable time.

It should be noted that the speed limiter can be personalized using any combination of the above options. For instance, the traffic sign-based option 410 and the map-based option 420 can be activated in parallel or in series. The system 100 can be configured to automatically switch between the two options based on real-time conditions. The ability to switch can be beneficial because, in some instances, the map-based option 420 or the traffic sign-based option 410 may not be suitable under current circumstances. For example, the map data 124 may not be updated to reflect new speed limit signs, temporary speed limit signs, or the map data 124 may not be speed limit data for the current location of the vehicle 105. In such cases, the system 100 can use the traffic sign-based option 410. On the other hand, the traffic sign-based option 410 may not be suitable when a traffic sign is at least partially not visible due to occlusions (e.g., object in front, dirt, etc.). In such cases, the system 100 can use the map-based option 420.

If neither the map-based option 420 nor the traffic sign-based option 410 are suitable at a given moment in time, the system 100 can use a default setting. As an example, the default setting can be the last known speed limit, a predetermined default speed limit, or some other speed limit. Alternatively or additionally, the system 100 can switch to another option. Alternatively or additionally, the system 100 can cause a notification to be presented to a user, such as on one or more of the output interface(s) 145.

When the traffic sign-based option 410 and the map-based option 420 are operated in series, there may be instances in which the speed limit information detected on a sign can differ from the speed limit information on a map. In such instances, the speed limiter module(s) 160 can be configured to resolve the conflict. As an example, the speed limiter module(s) 160 can be configured to select the lower speed limit of the two options. Alternatively, the speed limiter module(s) 160 can be configured to select the speed limit defined by the traffic sign.

If the user selects the recommendation option 440, then the system 100 can be configured to recommend speed limiter setting to a user. As noted above, the system 100 can include one or more recommendation modules 170. The recommendation module(s) 170 can provide a recommendation on how to set the speed limiter based on other people's experiences and habits that are most like the current driver or are based on road type or situation (e.g., speed traps). Based on the recommendation, the current user can choose whether or not to set the speed limiter according to the recommendation.

Figure 9:
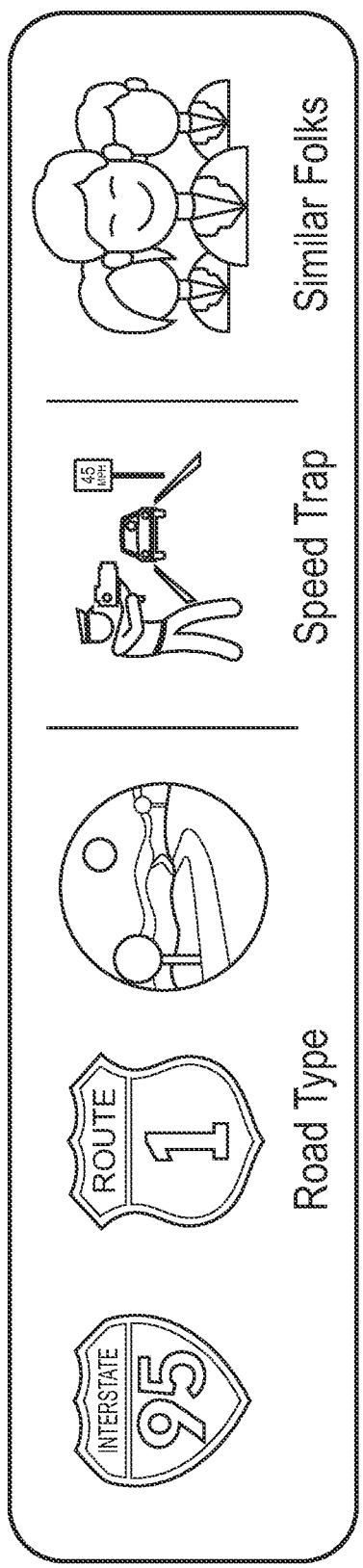
FIG. 9 is an example of a user interface element for a recommendation-based personalization option for the speed limiter.

The recommendation module(s) 170 can be configured to determine a recommended speed limiter setting based on one or more parameters. Some examples of the parameters are shown in FIG. 9. The recommended speed limiter setting can be presented to a vehicle occupant on the output interface(s) 145, such as on one or more of the displays 146.

One example of a parameter to the recommendation module(s) 170 can be a user's historical behavior, as set forth in the driving behavior data 122. The user can be the current driver of the vehicle or one or more similar drivers. Other non-limiting examples of parameters that can be used by the recommendation module(s) 170 can be current speed (m/s), desired speed (m/s), current acceleration (m/s^2), desired acceleration (m/s^2), latitude (float), longitude (float), vehicle ID (int), driver ID (int), visibility, speed limiter activation (bool), driver similarity score (int), current speed limiter setting (m/s^2), historical speed limiter setting (m/s^2), activation location (float), and/or other parameters.

The data for recommendation module(s) 170 can be sourced from the data store(s) 120, or it can be externally sourced (e.g., navigation/real-time traffic applications (e.g., Waze™), weather database, etc.). For instance, the recommendation module(s) 170 can take into account the location of law enforcement officers and/or speed traps. The recommendation module(s) 170 can also consider the type of road that the vehicle 105 is currently traveling on (e.g., highway, country, number of lanes, types of road (e.g., dirt or paved), etc.). The recommendation module(s) 170 can consider the occupant(s) of the vehicle 105. For instance, the recommendation module(s) 170 can make more conservative recommendations when other people are located within the vehicle 105. The recommendation module(s) 170 can consider weather conditions as it impacts a visibility of the driving environment, particularly with respect to speed limit signs.

Figure 7:
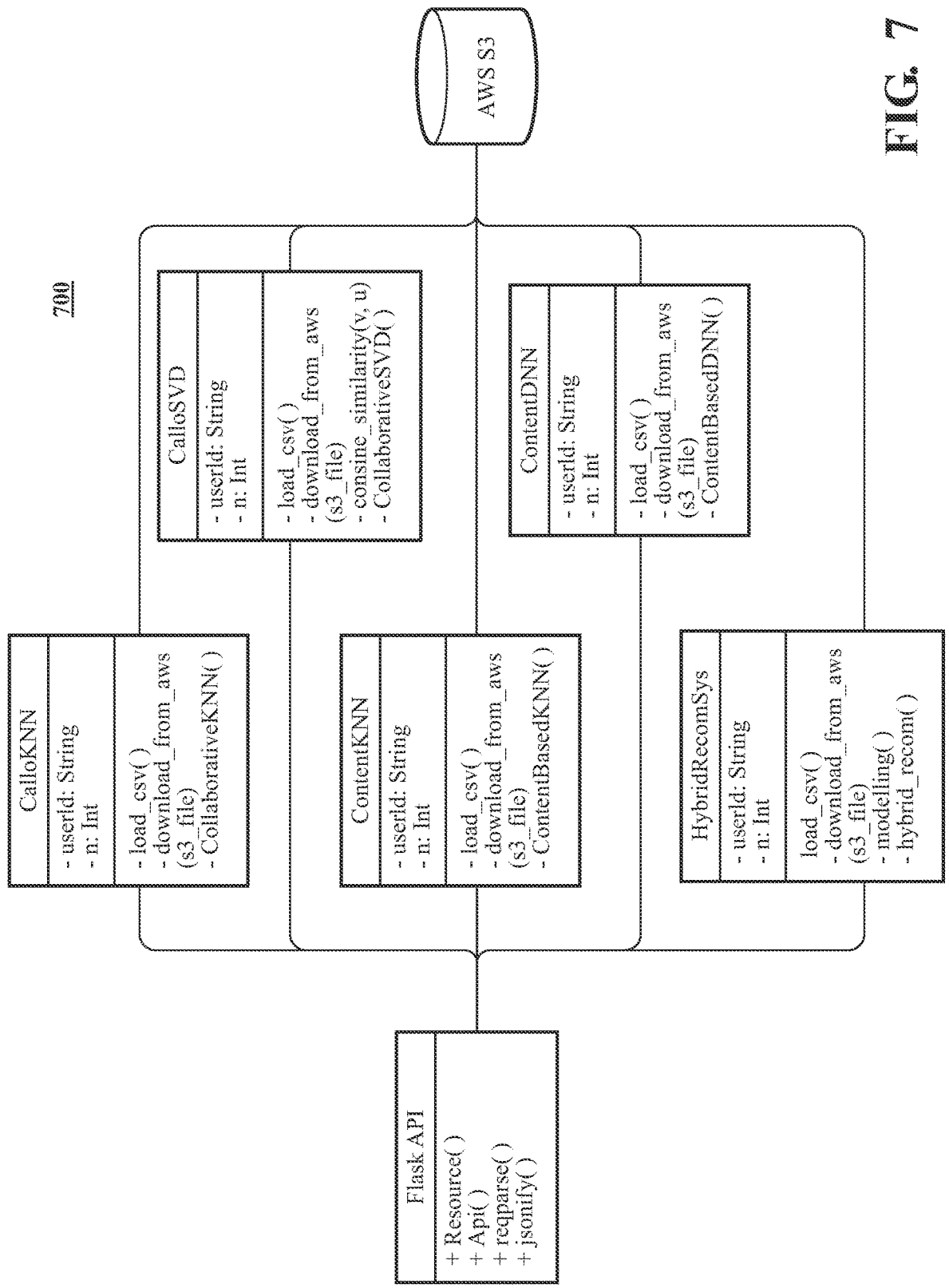
FIG. 7 is an example of an architecture for a recommendation engine.

FIG. 7 shows an example of an architecture 700 for the recommendation module(s) 170. In this example, the recommendation module(s) 170 can make a prediction based on users' historical behaviors (e.g., the driving behavior data 122). Collaborative filtering is a technique that does not need anything else except users' historical preference on a set of items. Because it is based on historical data, the core assumption can be that the users who have agreed in the past tend to also agree in the future.

The personalization of a driver can be stored in an artificial intelligence (AI) model for future use. This AI model can be continually updated based on driver behavior.

The system 100 can include an auto brake setting option 450. The auto brake setting option 450 can enable a user to select the style of braking that is used when the speed limiter is triggered. It will be appreciated that different users like different brake settings. The brake settings can be a personal preference and situation driven (speed traps, road conditions, traffic, etc.). Arrangements described herein can offer the personalization of braking upon triggering the speed limiter.

There can be a plurality of auto brake settings to select from. Non-limiting examples of the auto brake setting can include fast, medium, or slow. Of course, it will be appreciated that there can be additional, fewer, or alternative auto brake settings. A plurality of options can be presented to the user on the speed limiter settings menu 400 or a separate auto brake settings menu.

The fast brake setting will cause the vehicle 105 to sharply brake to keep the vehicle 105 at or under the speed limit. The slow brake setting will cause the vehicle 105 to brake slowly to keep the vehicle 105 at or under the speed limit. The medium brake setting can be somewhere in between the fast brake setting and the slow brake setting.

Figure 8:
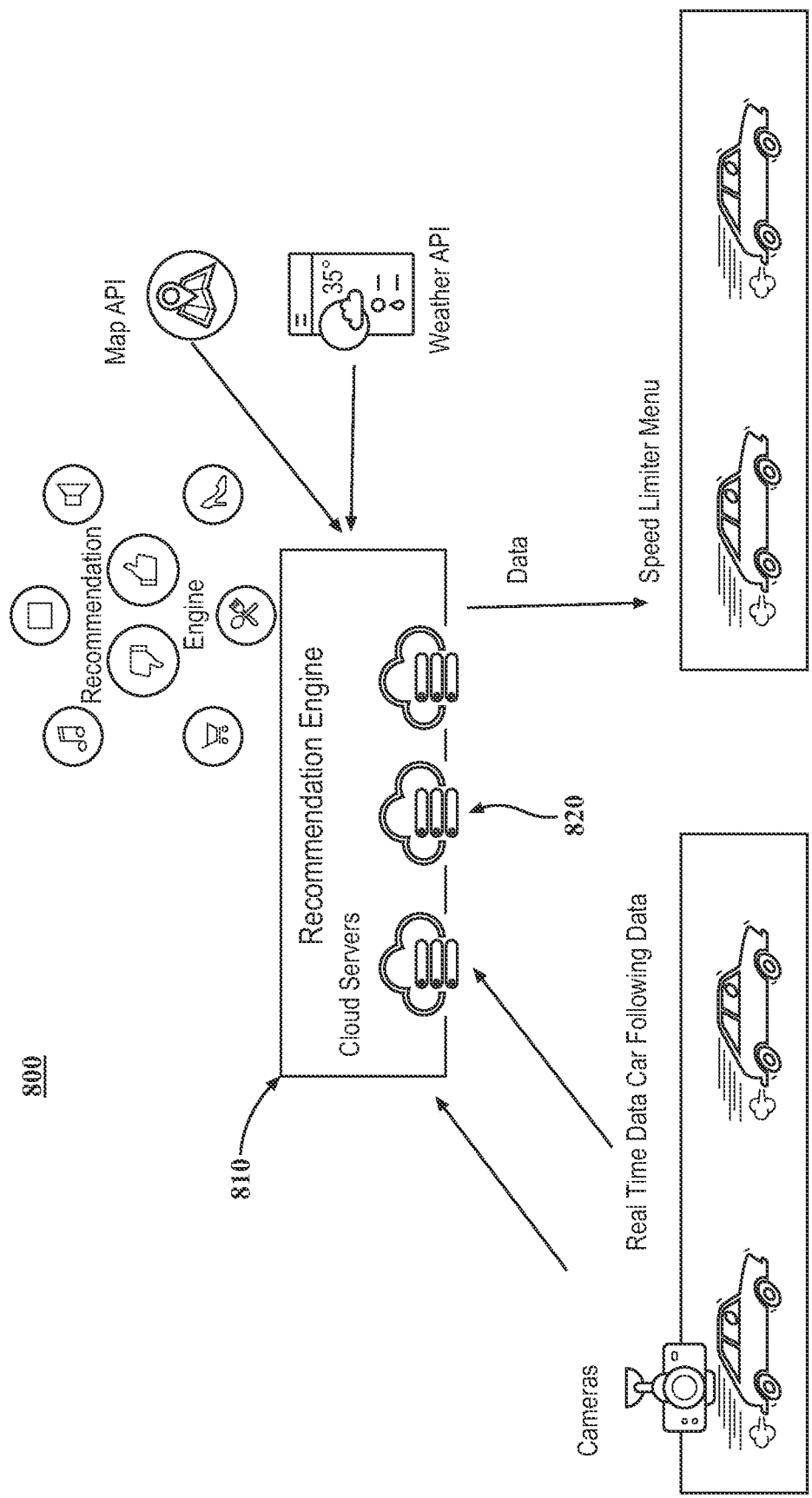
FIG. 8 is an example of a cloud-based speed limiter system.

The vehicle 105 and/or the system 100 can be part of a larger system. Referring to FIG. 8, an example of a system 800 for personalizing a speed limiter for a vehicle is shown. The system 800 can be cloud-based. Some of the possible elements of the system 800 are shown in FIG. 8 and will now be described. It will be understood that it is not necessary for the system 800 to have all of the elements shown in FIG. 8 or described herein.

The system 800 can include a recommendation engine 810. The recommendation can include one or more processors and/or one or more data stores. The system 800 can include one or more servers 820. The server(s) 820 can be located remote from the vehicle 105 and/or other connected entities or devices. The server(s) 820 can be any type of server, now known or later developed. In some arrangements, the server(s) 820 can be cloud-based server(s) or edge server(s). The server(s) 820 can communicate with the vehicle 105 and/or with the connected entities or devices over a communication network. FIG. 7 is a non-limiting example of an architecture for the recommendation engine 810.

The recommendation engine 810 can receive inputs from various sources. As an example, the recommendation engine 810 can receive input from one or more connected entities, weather sources, and map sources, just to name a few possibilities. A connected entity can include any device that is communicatively coupled to the server(s) 820. Non-limiting examples of the connected entities includes one or more connected vehicles and one or more connected infrastructure devices. The connected vehicle(s) can be any vehicle. The connected vehicle(s) can be configured to acquire driving environment data. In one example, the connected entity/entities and/or the connected vehicle(s) can send real-time car following data. In one or more arrangements, the weather sources can send current weather conditions at or near the location of the vehicle 105. In one or more arrangements, the map sources can provide any suitable information about the current location of the vehicle (e.g., the current speed limit).

Based on these and/or other inputs, the recommendation engine 810 can determine a recommended speed limiter. The recommendation engine 810 can do so continuously, periodically, irregularly, randomly, or upon the occurrence of some event or condition (e.g., new data received). The recommendation engine 810 can send the recommended speed limit to the vehicle 105. As a result, if the user selects the recommendation option from the user interface, the recommended speed limiter will be selected. The above discussion of the recommendation module 170 applies equally here. The recommendation module 170 can be on the server(s) 820.

One or more elements of the system 800 include and/or can execute suitable communication software, which enables two or more of the elements to communicate with each other through the communication network(s) and perform the functions disclosed herein.

Now that the various potential systems, devices, elements and/or components of the system 100 have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Turning to FIG. 11, an example of a method 1100 for personalizing a speed limiter for a vehicle is shown. At block 1110, the speed limiter can be caused to be activated. Such causing can be performed by the speed limiter module(s) 160 and/or the processor(s) 110. The speed limiter can be caused to be activated at any suitable point in time, such as automatically at vehicle start-up, automatically when the vehicle is in drive, in response to a user input, in response to a condition or event, or at any other time. When activated, the speed limiter can be ready to limit the maximum speed of the vehicle. The method 1100 can continue to block 1120.

At block 1120, a user input including a speed limiter personalization setting can be received. The user input can be provided on the input interface(s) 140. The user input can be provided by a touch input (e.g., by engaging a touchscreen) or a voice input (e.g., providing voice commands that can be detected by a microphone or other suitable form of input). The user input can be received by the speed limiter module(s) 160 and/or the processor(s) 110. The method 1100 can continue to block 1130.

At block 1130, the speed limiter personalization setting can be caused to be implemented. Such causing can be performed by the processor(s) 110 and one or more of the modules (e.g., the speed limiter module(s) 160, the recommendation module(s) 170, the map module(s) 180, and/or the traffic sign module(s) 190).

The method 1100 can end. Alternatively, the method 1100 can return to block 1110 or to some other block. The method 1100 can be repeated at any suitable point, such as at a suitable time or upon the occurrence of any suitable event or condition.

Figure 6:
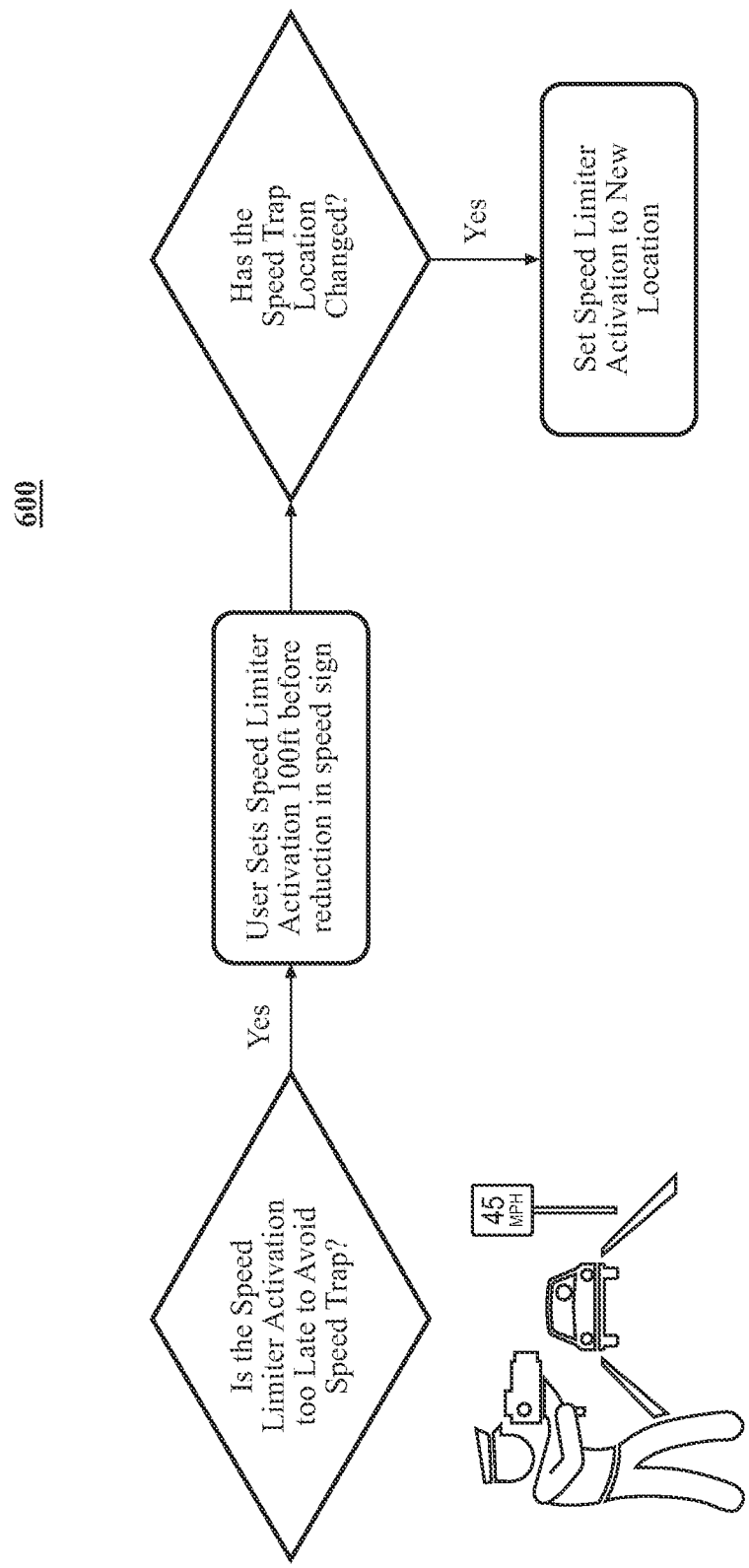
FIG. 6 is an example of a user personalization method.

FIG. 6 is another example of a method 600 of user personalization.

A non-limiting example of the above-described systems, methods and/or arrangements will be described in relation to FIG. 10. For purposes of this example, the vehicle 105 can be operating in a driving environment 1000 in which there are multiple speed limits on a single short road section. The vehicle 105 can be traveling on a road 1001. There can be a first speed limit zone 1010, a second speed limit zone 1020, and a third speed limit zone 1030 on the road 1001. In the first speed limit zone 1010, the speed limit can be 25 miles per hour (mph). In the second speed limit zone 1020, the speed limit can be 35 mph. In the third speed limit zone 1030, the speed limit can be 25 mph. Thus, the speed limit goes down from 35 mph to 25 mph and back to 35 mph in a short stretch on the road 1001.

Figure 10:
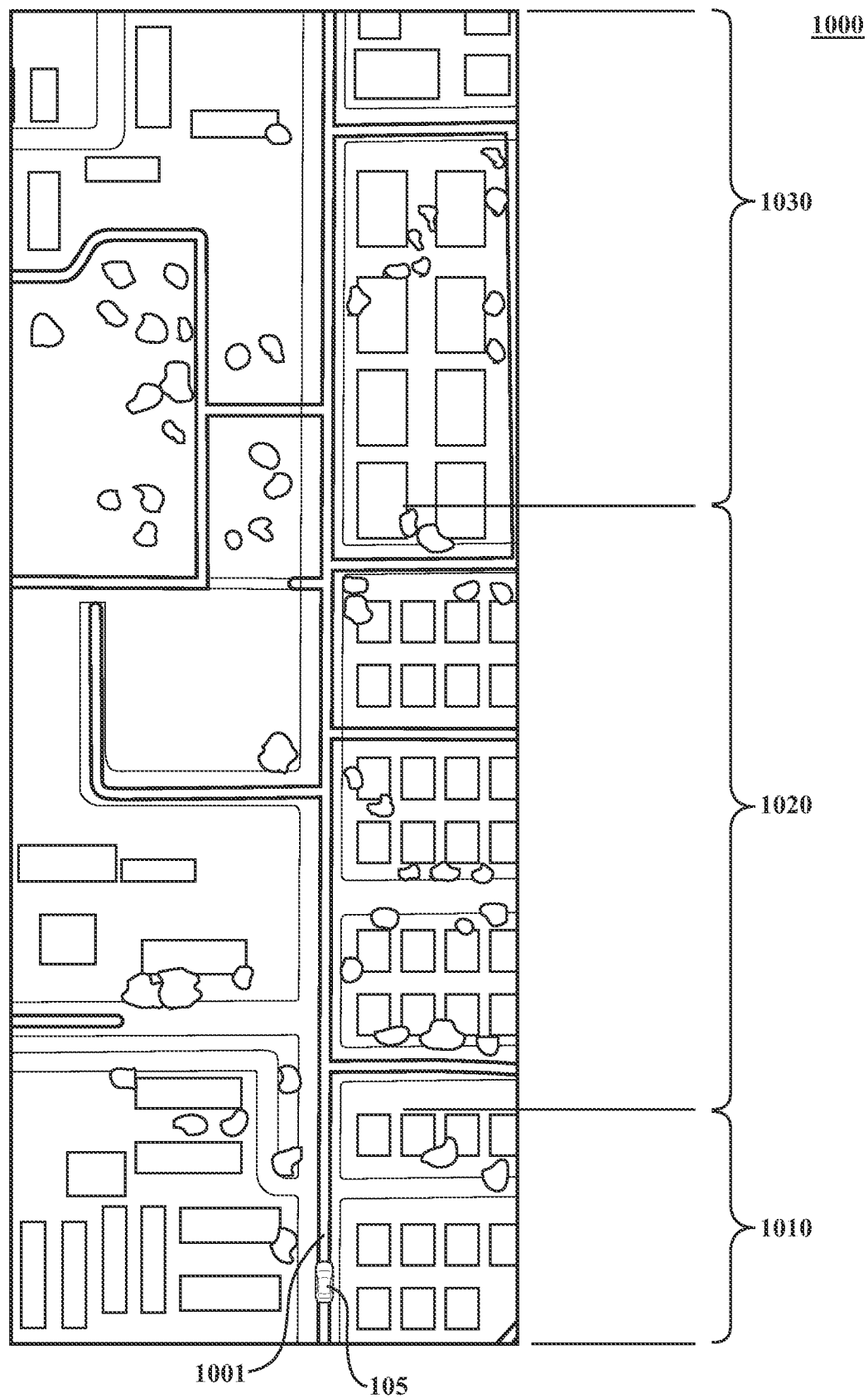
FIG. 10 is an example of a driving scenario in which multiple speed limits are present in a single short road section.

The situation in FIG. 10 may be one in which neither the traffic sign-based option 410 nor the map-based option 420 is ideal. In a scenario like FIG. 10, a driver may miss the subtle change in speed limit, and the traffic sign-based option 410 and the map-based option 420 are not quick enough for the car to slow down and avoid a traffic ticket, if there is a police officer waiting in the second speed limit zone 1020. As a result, the driver may want to trigger the reduction in speed a little earlier when going from a higher speed limit (e.g., the first speed limit zone 1010) to a lower speed limit (e.g., the second speed limit zone 1020). This can be set up in the system. The driver can select when the speed limit (reduction) will trigger. It could trigger right when an area (zone) begins or before the area (zone), say 100 ft before the reduced speed limit zone. The driver can increase or decrease the distance per personal preference.

It will be appreciated that arrangements described herein can provide numerous benefits, including one or more of the benefits mentioned herein. For example, arrangements described herein can provide a speed limited that can be customized by a user. Arrangements described herein can enable more personalized and relevant settings. Arrangements described herein can provide a software defined speed limiter. Arrangements described herein are more versatile than a hardware switch for a speed limiter. Arrangements described herein can provide a speed limiter set in the user interface of the vehicle, thereby saving real estate on the steering wheel or other location in which speed limited hardware switches are provided. Arrangements described herein can provide flexibility in the underlying factors of the speed limiter. Arrangements described herein can provide options for personalization of the speed limiter. Arrangements described herein can offer speed limiters that are map-based, traffic sign-based, user defined, and/or recommendation defined. Arrangements described herein can also provide settings for braking when activating the speed limiter. Arrangements described herein can improve the driving experience, avoid speeding tickets especially near police traps, and avoid accidents.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "or" is intended to mean an inclusive "or" rather than an exclusive "or." The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g., AB, AC, BC or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope thereof.

What is claimed is:

1. A method of personalizing a speed limiter for a vehicle, the method comprising:
   causing the speed limiter to be activated;
   presenting a speed limiter user interface element to a user on a visual user interface;
   when a user selects the speed limiter user interface element, cause a menu to be presented to the user on the visual user interface, the menu including a plurality of speed limiter personalization options including at least two of: a traffic sign-based option, a map-based option, a user defined option, a recommendation option, and an auto brake setting option;
   receiving a user input corresponding to a selected one of the speed limiter personalization options; and
   causing the selected one of the speed limiter personalization options to be implemented.

2. The method of claim 1, wherein, when the selected one of the speed limiter personalization options is the traffic sign-based option, the causing includes:
   acquiring visual data of a driving environment of the vehicle;
   analyzing the visual data to detect whether a speed limit sign is present in the visual data;
   responsive to detecting a speed limit sign in the visual data, determining a speed limit based on the speed limit sign; and
   adjusting the speed limiter based on the speed limit determined based on the speed limit sign.

3. The method of claim 1, wherein, when the selected one of the speed limiter personalization options is the map-based option, the causing includes:
   determining a current location of the vehicle on a map;
   determining whether the map includes speed limit information for the current location of the vehicle; and
   responsive to determining that the map includes speed limit information for the current location of the vehicle, adjusting the speed limiter based on the speed limit information for the current location of the vehicle.

4. A method of personalizing a speed limiter for a vehicle, the method comprising:
   causing the speed limiter to be activated;
   receiving a user input on a user interface, the user input including a speed limiter personalization setting, the speed limiter personalization setting including traffic sign speed limit recognition and map-based speed limit recognition; and causing the speed limiter personalization setting to be implemented including:

acquiring visual data of a driving environment of the vehicle;

analyzing the visual data to detect whether a speed limit sign is present in the visual data;

responsive to detecting that a speed limit sign is present in the visual data:

determining a speed limit based on the speed limit sign; and adjusting a setting of the speed limiter based on the determined speed limit; and responsive to determining that a speed limit sign is not present in the visual data:

determining a current location of the vehicle on a map;

determining whether the map includes speed limit information for the current location of the vehicle; and responsive to determining that the map includes speed limit information for the current location of the vehicle, adjusting a setting of the speed limiter based on the speed limit information for the current location of the vehicle.

5. The method of claim 1, wherein, when the selected one of the speed limiter personalization options is the user defined option, the causing includes:

receiving a user input including a user defined setting of the speed limiter; and adjusting the speed limiter based on the user defined setting.

6. A method of personalizing a speed limiter for a vehicle, the method comprising:

causing the speed limiter to be activated;

receiving a user input on a user interface, the user input including a user defined setting of the speed limiter, the user defined setting being a speed limit distance trigger before a reduced speed limit zone, whereby when the speed limiter will be triggered before the reduced speed limit zone is selectable by the user; and causing the user defined setting to be implemented.

7. A method of personalizing a speed limiter for a vehicle, the method comprising:

causing the speed limiter to be activated;

receiving a user input on a user interface, the user input including a user defined setting of the speed limiter, the user defined setting being a brake setting, whereby a degree of braking upon triggering the speed limiter is selectable by the user; and causing the user defined setting to be implemented.

8. A method of personalizing a speed limiter for a vehicle, the method comprising:

causing the speed limiter to be activated;

receiving a user input on a user interface, the user input being a recommendation-based speed limiter suggestion by an artificial intelligence model; and causing the recommendation-based speed limiter suggestion to be implemented.

9. A system for personalizing a speed limiter for a vehicle, the system comprising:

a visual user interface; and a processor operatively connected to the visual user interface and programmed to initiate executable operations comprising:

causing the speed limiter to be activated;

presenting a speed limiter user interface element to a user on a visual user interface;

when a user selects the speed limiter user interface element, cause a menu to be presented to the user on the visual user interface, the menu including a plurality of speed limiter personalization options including at least two of: a traffic sign-based option, a map-based option, a user defined option, a recommendation option, and an auto brake setting option;

receiving a user input corresponding to a selected one of the speed limiter personalization options; and causing the selected one of the speed limiter personalization options to be implemented.

10. The system of claim 9, wherein, when the selected one of the speed limiter personalization options is the traffic sign-based option, the causing includes:

acquiring visual data of a driving environment of the vehicle;

analyzing the visual data to detect whether a speed limit sign is present in the visual data;

responsive to detecting a speed limit sign in the visual data, determining a speed limit based on the speed limit sign; and adjusting the speed limiter based on the speed limit determined based on the speed limit sign.

11. The system of claim 9, wherein, when the selected one of the speed limiter personalization options is the map-based option, the causing includes:

determining a current location of the vehicle on a map;

determining whether the map includes speed limit information for the current location of the vehicle; and responsive to determining that the map includes speed limit information for the current location of the vehicle, adjusting the speed limiter based on the speed limit information for the current location of the vehicle.

12. A system for personalizing a speed limiter for a vehicle, the system comprising:

a user interface; and a processor operatively connected to the user interface and programmed to initiate executable operations comprising:

causing the speed limiter to be activated;

receiving a user input on the user interface, the user input being a speed limiter personalization setting including traffic sign speed limit recognition and map-based speed limit recognition; and causing the speed limiter personalization setting to be implemented including:

acquiring visual data of a driving environment of the vehicle analyzing the visual data to detect whether a speed limit sign is present in the visual data;

responsive to detecting that a speed limit sign is present in the visual data:

determining a speed limit based on the speed limit sign; and adjusting a setting of the speed limiter based on the determined speed limit; and responsive to determining that a speed limit sign is not present in the visual data:

determining a current location of the vehicle on a map;

determining whether the map includes speed limit information for the current location of the vehicle; and responsive to determining that the map includes speed limit information for the current location of the vehicle, adjusting a setting of the speed limiter based on the speed limit information for the current location of the vehicle.

13. The system of claim 9, wherein the speed limiter personalization options is the user defined option, the causing includes:

receiving a user input including a user defined setting of the speed limiter; and adjusting the speed limiter based on the user defined setting.

14. A system for personalizing a speed limiter for a vehicle, the system comprising:

a user interface; and a processor operatively connected to the user interface and programmed to initiate executable operations comprising:

causing the speed limiter to be activated;

receiving a user input on a user interface, the user input including a user defined setting of the speed limiter, the user defined setting being a speed limit distance trigger before a reduced speed limit zone, whereby when the speed limit will be triggered before the reduced speed limit zone is selectable by the user; and causing the user defined setting to be implemented.

15. A system for personalizing a speed limiter for a vehicle, the system comprising:

a user interface; and a processor operatively connected to the user interface and programmed to initiate executable operations comprising:

causing the speed limiter to be activated;

receiving a user input on a user interface, the user input including a user defined setting of the speed limiter, the user defined setting being a brake setting, whereby a degree of braking upon triggering the speed limiter is selectable by the user; and causing the user defined setting to be implemented.

16. A system for personalizing a speed limiter for a vehicle, the system comprising:

a user interface; and a processor operatively connected to the user interface and programmed to initiate executable operations comprising:

causing the speed limiter to be activated;

receiving a user input on a user interface, the user input being a recommendation-based speed limiter suggestion by an artificial intelligence model; and causing the recommendation-based speed limiter suggestion to be implemented.

17. The system of claim 9, wherein the visual user interface is one of:

a graphical user interface presented on a display; and a projection presented on a surface.

18. The system of claim 17, wherein the visual user interface the visual user interface is located within a vehicle.

* * * * *